(12) United States Patent
Verrilli et al.

(10) Patent No.: US 11,010,313 B2
(45) Date of Patent: May 18, 2021

(54) METHOD, APPARATUS, AND SYSTEM FOR AN ARCHITECTURE FOR MACHINE LEARNING ACCELERATION

(71) Applicant: QUALCOMM Incorporated, San Diego, CA (US)

(72) Inventors: Colin Beaton Verrilli, Apex, NC (US); Natarajan Vaidhyanathan, Carrboro, NC (US); Rexford Alan Hill, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/556,094

(22) Filed: Aug. 29, 2019

(65) Prior Publication Data

US 2020/0073830 A1 Mar. 5, 2020

Related U.S. Application Data

(60) Provisional application No. 62/724,051, filed on Aug. 29, 2018.

(51) Int. Cl.
*G06F 13/16* (2006.01)
*G06F 17/16* (2006.01)
(Continued)

(52) U.S. Cl.
CPC .......... *G06F 13/1668* (2013.01); *G06F 17/16* (2013.01); *G06N 3/10* (2013.01); *H04L 12/18* (2013.01); *H04L 12/46* (2013.01)

(58) Field of Classification Search
CPC ....... G06F 13/1668; G06N 3/10; H04L 12/18; H04L 12/46
See application file for complete search history.

(56) References Cited

U.S. PATENT DOCUMENTS 7,613,886 B2 * 11/2009 Yamazaki ............. G06F 15/167
711/147
9,547,876 B2 * 1/2017 McCormick ........... G06Q 10/10
(Continued)

FOREIGN PATENT DOCUMENTS

EP 3343460 A1 7/2018
WO 2008046716 4/2008

OTHER PUBLICATIONS

Duren R. W., et al., "Application of Data Compression to the MIL-STD-1553 Data Bus", 2008 IEEE Aerospace Conference; Mar. 1-8, 2008; Big Sky; MT, USA, IEEE, Piscataway, NJ, USA, Mar. 1, 2008 (Mar. 1, 2008), pp. 1-10, XP031256421, ISBN: 978-1-4244-1487-1, p. 3, Right-hand column, line 23—p. 4, Left-hand column, line 27.

(Continued)

*Primary Examiner* — Henry Tsai
*Assistant Examiner* — Christopher A Daley
(74) *Attorney, Agent, or Firm* — Edward J. Mesiarosh (57) ABSTRACT

A method, apparatus, and system for an architecture for machine learning acceleration is presented. An apparatus includes a plurality of processing elements, each including a tightly-coupled memory, and a memory system coupled to the processing elements. A global synchronization manager is coupled to the plurality of the processing elements and to the memory system. The processing elements do not implement a coherency protocol with respect to the memory system. The processing elements implement direct memory access with respect to the memory system, and the global synchronization manager is configured to synchronize operations of the plurality of processing elements through the TCMs.

21 Claims, 3 Drawing Sheets

(51) Int. Cl.
*G06N 3/10* (2006.01)
*H04L 12/18* (2006.01)
*H04L 12/46* (2006.01)

(56) References Cited

U.S. PATENT DOCUMENTS

| | | | |
|---|---|---|---|
| 10,019,668 B1 | 7/2018 | Woo | |
| 10,198,301 B2 * | 2/2019 | Tsuda | G06F 9/4812 |
| 2010/0313150 A1 * | 12/2010 | Morris | G06F 9/452 |
| | | | 715/761 |
| 2014/0085417 A1 * | 3/2014 | Shi | H04N 19/61 |
| | | | 348/43 |
| 2016/0062947 A1 * | 3/2016 | Chetlur | G06F 17/153 |
| | | | 708/420 |
| 2016/0224465 A1 * | 8/2016 | Morad | G06F 9/3887 |
| 2016/0328644 A1 * | 11/2016 | Lin | G06N 3/084 |
| 2017/0032487 A1 | 2/2017 | Ashari et al. | |
| 2019/0156246 A1 * | 5/2019 | Kuo | G06F 8/60 |
| 2019/0294413 A1 * | 9/2019 | Vantrease | G06N 3/08 |
| 2019/0325305 A1 * | 10/2019 | Zhang | G06N 3/063 |
| 2020/0074318 A1 * | 3/2020 | Chen | G06K 9/00711 |

OTHER PUBLICATIONS

International Search Report and Written Opinion—PCT/US2019/048938—ISA/EPO—dated Nov. 4, 2019.

\* cited by examiner

METHOD, APPARATUS, AND SYSTEM FOR AN ARCHITECTURE FOR MACHINE LEARNING ACCELERATION

CLAIM OF PRIORITY UNDER 35 U.S.C. § 119

The present Application claims priority to U.S. Provisional Patent Application No. 62/724,051 entitled "METHOD, APPARATUS, AND SYSTEM FOR AN ARCHITECTURE FOR MACHINE LEARNING ACCELERATION" filed Aug. 29, 2018, assigned to the assignee hereof and hereby expressly incorporated by reference herein.

BACKGROUND

Artificial Neural Networks (ANNs) are used to perform an increasing number and variety of tasks, such as, for example, object recognition, speech recognition, speech generation, providing recommendations, and predicting user behavior. Performing these tasks may be referred to as inferencing using an ANN model. To provide useful inferences, an ANN model needs to be designed and trained for the particular task. The ANN design establishes parameters such as the number of layers of the ANN model and the characteristics of each layer. The training of the ANN uses training data, inferencing using the ANN model, feedback based on evaluation of the inference, and backpropagation to adjust the weights of the ANN model in response to the feedback. After numerous training cycles of inferencing and backpropagation, the resultant model may provide satisfactory results in response to new input data. Note that many ANNs have multiple hidden layers between an input layer and an output layer and may consequently be referred to as Deep Neural Networks (DNNs).

To provide a satisfactory user experience, not only do the inference results need to be correct, but they also need to be provided fairly quickly—often within a fraction of a second (response latency within service level agreement). To do this, service providers use large arrays of inference accelerators located "in the cloud"—that is, communicatively coupled to, and located remotely from, a client device.

Client computer devices may include, for example, computers, automobiles, smartphones, smart wearable devices, and internet-of-things (IoT) devices. The so-called cloud may comprise a plurality of interconnected servers located at a data center and may be managed by a cloud provider entity such as, for example, Amazon.com, Inc. of Seattle, Wash. or Facebook, Inc., of Menlo Park, Calif. Each host server comprises a plurality of interconnected inference accelerators, which may be provided by an inference-accelerator provider entity. Each accelerator comprises processor and memory components.

The cloud may support many millions of neural network applications. A neural network application running on a client computer device communicates with the cloud to receive inference acceleration and/or assistance. For example, a speech-translation neural-network application (NNA) may transmit a raw or encoded audio snippet to the cloud for rapid translation and provision of the translation in response to the NNA. A media-recommendation program that recommends, e.g., songs or video—where the media may comprise many millions, or even billions, of options hosted by the cloud provider in the cloud—may communicate with the cloud to have the cloud perform an inference to generate a recommendation for provision to a user of the client computer device.

In the data center context, various heterogenous architectures have been employed to handle machine learning workloads. For example, cloud compute may use server-class central processing units (CPUs) or graphics processing units (GPUs) and may adapt their workloads to those architecture. However, these architectures may not be tailored to the specific characteristics of machine learning algorithms, with the effect that their performance is not as efficient as desired, and/or they consume more power to achieve a given level of performance than would be desirable. As there may be many millions of NNAs accessing the inference accelerators of the cloud at any one time, efficient inference accelerators would be beneficial for reducing power usage and/or reducing inference time.

Thus, it would be desirable to provide an inference-accelerator computing architecture that is scalable to cloud computing and data center application, while providing improved performance per watt when compared to existing server-class CPU and GPU-based solutions.

SUMMARY OF THE DISCLOSURE

In one aspect, an apparatus includes a plurality of processing elements, each including a tightly-coupled memory (TCM), and a memory system coupled to the processing elements. A global synchronization manager is coupled to the plurality of the processing elements and to the memory system. The processing elements do not implement a coherency protocol with respect to the memory system. The processing elements implement direct memory access with respect to the memory system, and the global synchronization manager is configured to synchronize operations of the plurality of processing elements through the TCMs.

In another aspect, an apparatus includes a plurality of processing elements and a first network coupling each processing elements of the plurality of processing elements to the other processing elements of the processing elements, the first network configured to perform multicast operations. The apparatus further includes a memory system and a second network, separate from the first network, coupling each processing element of the plurality of processing elements to the other processing elements of the plurality of processing elements and to the memory system.

In yet another aspect, a method comprises transforming a neural network into a directed acyclic graph by a compiler and transforming the directed acyclic graph into computation and/or data movement operations by the compiler. The method further comprises statically scheduling the computation and/or data movement operations for execution in parallel pipelines by the compiler. The computation and/or data movement operations may be dispatched in a plurality of portions in accordance with dispatch scaling.

Some advantages of the disclosed aspects may include providing a scalable architecture for cloud computing that provides improved interconnection between processing elements, and a compiler that produces a more efficient mapping of neural network operations onto available hardware.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
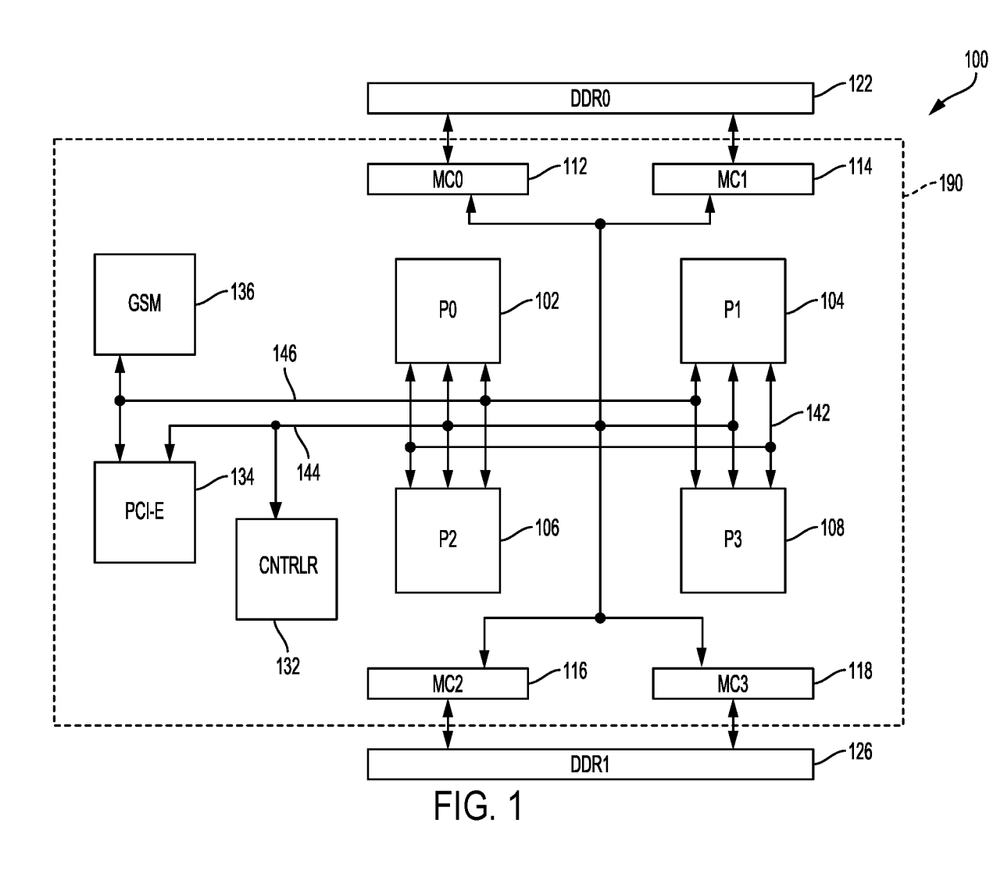
FIG. 1 is block diagram of an exemplary inference accelerator in accordance with an embodiment of the disclosure.

FIG. 1 is a simplified schematic diagram of an exemplary inference accelerator 100 in accordance with an embodiment of the disclosure. The inference accelerator 100 comprises a system-on-chip (SoC) 190 coupled to a first double data rate (DDR) dynamic random-access memory (DRAM) 122 and a second DDR DRAM 126. The SoC 190 comprises a first processing element 102, a second processing element 104, a third processing element 106, and a fourth processing element 108. The processing elements 102, 104, 106, and 108 are coupled together via a compute network-on-chip (NoC) 142. Note that the terms "NoC" and "network" may be used interchangeably herein. Note that inference accelerators in accordance with this disclosure are not limited to any particular number of processing elements and alternative implementations may have more or fewer than four processing elements.

The SoC 190 further comprises a first memory interface 112, a second memory interface 114, a third memory interface 116, a fourth memory interface 118, and a PCI Express (PCIe) block 134, all coupled to each other and to the processing elements 102, 104, 106, and 108 via a system/memory (sys/mem) NoC 144. The PCIe block 134 is an interface used by the inference accelerator 100 to receive the inputs for inferences (e.g., images, videos, audio clips, or other data tensors) received by the host server and to provide results back to the host server. The system-on-chip 190 further comprises a management controller 132, which is coupled to the PCIe block 134, the memory controllers 112, 114, 116, and 118, and the processing elements 102, 104, 106, and 108 via the system/memory NoC 144. Note that, in some implementations, the compute network 142 may also connect to the PCIe block 134 and/or the memory controllers 112, 114, 116, and 118.

Further, a global synchronization manager (GSM) module 136 is coupled to the PCIe block 134 and a local sync manager (see FIG. 1A) in each processing element 102, 104, 106, and 108 via a private NoC 146. It should be noted that in alternative implementations, one or more of the compute NoC 142, sys/mem NoC, and private NoC 146 may be replaced by a corresponding simple bus, or other communication fabric, other than a NoC. It should also be noted that in some alternative embodiments, the compute NoC and sys/mem NoC may be combined into a single combined compute/system/memory NoC. It should be further noted that some alternative implementations of the inference accelerator 100 do not include a private NoC and, instead, the GSM 136 communicates with other elements (e.g., the processing elements 102, 104, 106, and 108) via other means (e.g., sys/mem NoC 144).

The processing elements 102, 104, 106, and 108 may be neural processing units (NPUs), neural signal processors (NSPs), digital signal processors (DSPs), or any other suitable type of processor (e.g., CPUs or GPUs). In some homogenous embodiments (where the processing elements 102, 104, 106, and 108 are substantially the same) each of the processing elements 102, 104, 106, and 108 may include scalar, vector, matrix processing capabilities (e.g., multiplication, convolution, point-wise addition, point-wise multiplication), and data-movement capabilities (e.g., load, store, and direct memory access (DMA)). In some alternative embodiments, the scalar, vector, matrix, and data-movement processing capabilities may be distributed across different processing elements (in other words, the processing elements 102, 104, 106, and 108 may be heterogeneous). Additionally, whichever of the processing elements 102, 104, 106, and 108 provide matrix processing capabilities may further include floating point capabilities as part of the matrix processing capabilities. Providing these capabilities in each of the processing elements 102, 104, 106, and 108 may enable a compiler for the inference accelerator 100 to more efficiently schedule code on the individual processing elements, as will be explained in greater detail with respect to FIG. 2.

Figure 1A:
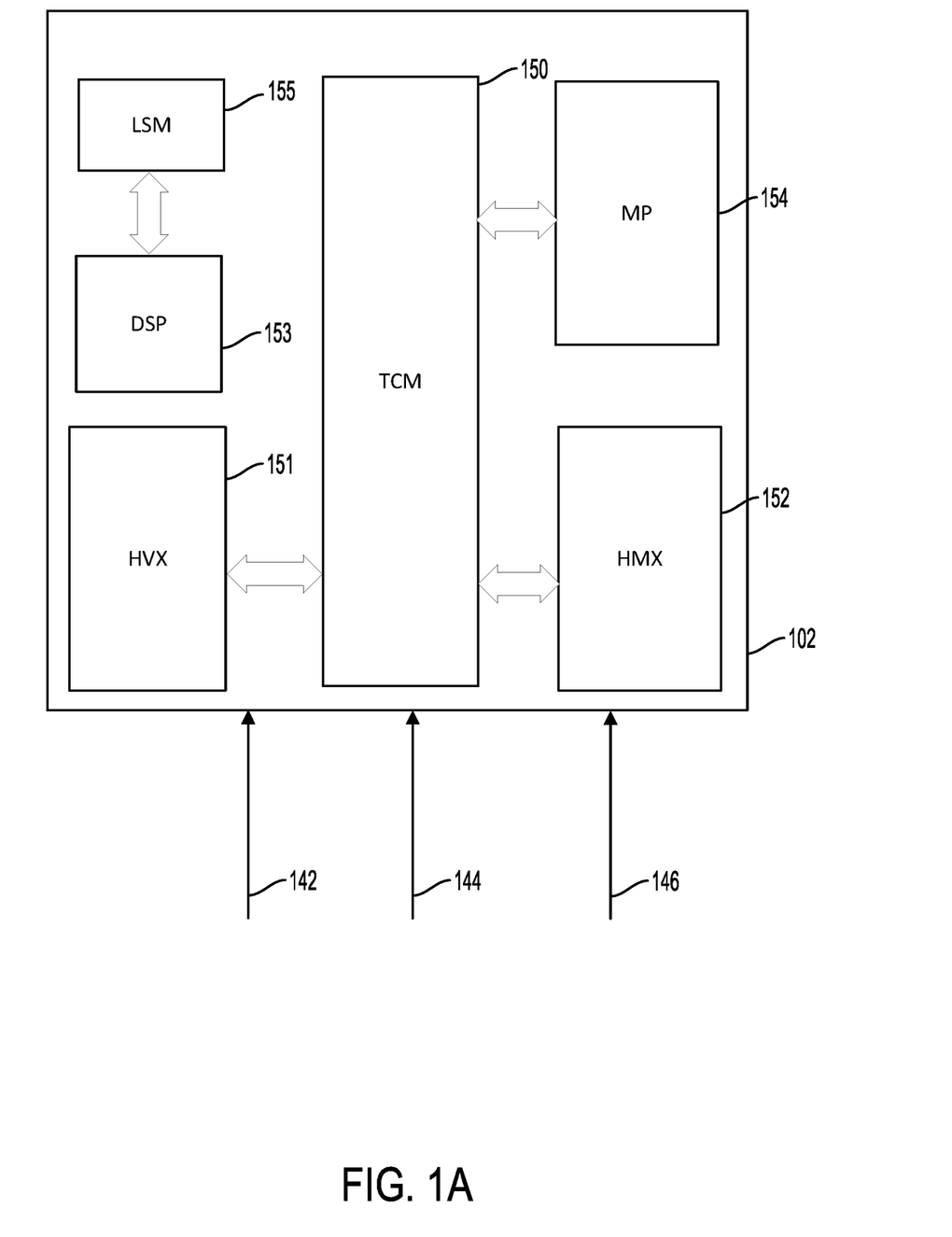
FIG. 1A is a simplified schematic diagram of an exemplary implementation of the processing element of FIG. 1.

FIG. 1A is a simplified schematic diagram of an exemplary implementation of the processing element 102 of FIG. 1. As noted above, in some embodiments, processing elements 104, 106, and 108 may be configured identically. The processing element 102 comprises tightly-coupled memory (TCM) 150, vector processing module 151, matrix processing module 152, scalar processing (e.g., DSP) module 153, memory processing module 154, and an optional local synchronization manager (LSM) 155. The TCM 150 is directly connected to at least the vector processing module 151, the matrix processing module 152, and the memory processing module 154. The LSM 155 is directly connected to at least the scalar processing module 153. The processing element 102 is connected to NoCs 142, 144, and 146.

In some implementations, each LSM 155 of a processing element is connected to the GSM 136 of FIG. 1, where the processing elements 102, 104, 106, and 108 implement hardware memory synchronization using LSM 155 working with GSM 136 to coordinate and synchronize data transfers among the processing elements 102, 104, 106, and 108 and the DRAMs 122 and 126, by setting and resetting semaphores that allow or prohibit corresponding data operations. In this implementation, the LSM 155 may be referred to as a synchronization module. In some implementations, the GSM 136 works directly with the TCMs 150 of the processing elements 102, 104, 106, and 108 (forgoing LSMs 155) to set and reset values at known locations in the TCMs 150, where those values similarly allow or prohibit corresponding data operations. In this implementation, the TCM 150 may be referred to as a synchronization module.

The processing element 102 may forgo implementing a memory coherency protocol. Implementing a memory coherency protocol typically includes having a shared cache connected to a plurality of clients and an interconnecting bus with a coherency protocol to ensure that each client is referencing the latest version of corresponding data. Using caches and implementing a coherency protocol are useful when data movement and sharing is not sequential and not deterministic—in other words, what is conventionally referred to as "random." Caches and coherency are also useful where data movements and sharing are relatively fine-grained. Semaphores, on the other hand, use the setting and modifying of so-called semaphores to gate data movement among a plurality of clients and gate computations involving the data—without using a cache or a bus implementing a coherency protocol. Neural-network inferencing involves large movements of data, and calculations based on that data, whose pattern is known ahead of time. Consequently, the integrity of that data may be maintained using a relatively simple semaphore mechanism. Since implementing memory coherency protocols requires relatively significant power levels, substituting hardware synchronization for coherency allows the inference accelerator 100 to maintain the needed level of memory synchronization at a relatively reduced power level.

Returning to FIG. 1, the compute network 142 coupling the processing elements 102, 104, 106, and 108 may be a relatively higher-bandwidth network (as compared to the sys/mem network 144 and the private network 146), and may support multicast operations (i.e., sending data produced by a single processing element to multiple other processing elements of the inference accelerator 100). The processing elements 102, 104, 106, and 108 may each include tightly-coupled memory (e.g. TCM 150 of FIG. 1A), and may interact with the first DRAM 122 and the second DRAM 126 via the sys/mem network 144 and the memory controllers 112, 114, 116, and 118. Both the compute network 142 and the sys/mem network 144 may support DMA operations from the TCMs (e.g. TCM 150) of each of the processing elements 102, 104, 106, and 108, including read operations, write operations, and, in the case of the compute network 142, multicast operations.

The private network 146 may be a relatively slower and lower-bandwidth network (as compared to the compute network 142 and the sys/mem network 144), as its use may be limited to a configuration time (as opposed to run time) and, thus, would not have a specific performance requirement (as opposed to the compute network 142 and the sys/mem network 144). Having separate networks for these specific purposes allows each of the networks to be designed to match its corresponding expected traffic type and allows each to be individually performance and power optimized to match.

For example, since the workloads handled by the inference accelerator 100 may often involve data words that are all zeros (but that must still be transmitted among the processing elements 102, 104, 106, and 108), the compute network 142 may implement a "zero" encoding protocol, where setting a single override bit on the network bus indicates that the value of the corresponding data word is zero, without having to actually set all the bits of the data bus for that data word to zero or read all of the corresponding bits of the data word. This may reduce power usage both directly and by allowing for the implementation of power-saving operations based on the override bit.

Further, as indicated above, the inference accelerator 100 does not implement a memory coherency protocol, instead managing dependencies that do occur using hardware semaphores and compiler design (as explained later with respect to FIG. 2) in accordance with the global sync manager 136, which is configured to interact with the processing elements 102, 104, 106, and 108 to provide hardware semaphore support. Essentially, each of the processing elements 102, 104, 106, and 108 may set semaphores in the global sync manager 136, which may be cleared by the other processing elements 102, 104, 106, and 108 to allow for interdependencies in workloads being processing by the processing elements 102, 104, 106, and 108.

The latency involved in communications between the processing elements 102, 104, 106, and 108 and the global sync manager 136 may be important for the overall performance of the inference accelerator 100. Thus, the topology of the private network 146 providing connectivity between the global sync manager 136 and the processing elements 102, 104, 106, and 108 may depend on the relative number of processing elements that will be coupled to the global sync manager 136. In systems with relatively few processing elements, a ring topology may be used instead of the network 146 shown. In systems with larger numbers of processing elements, a star topology may be used. Those having skill in the art will recognize that the choice of topology may be informed by many factors involved in the overall system design, and the teachings of the present disclosure do not depend on the use of a particular topology.

Figure 2:
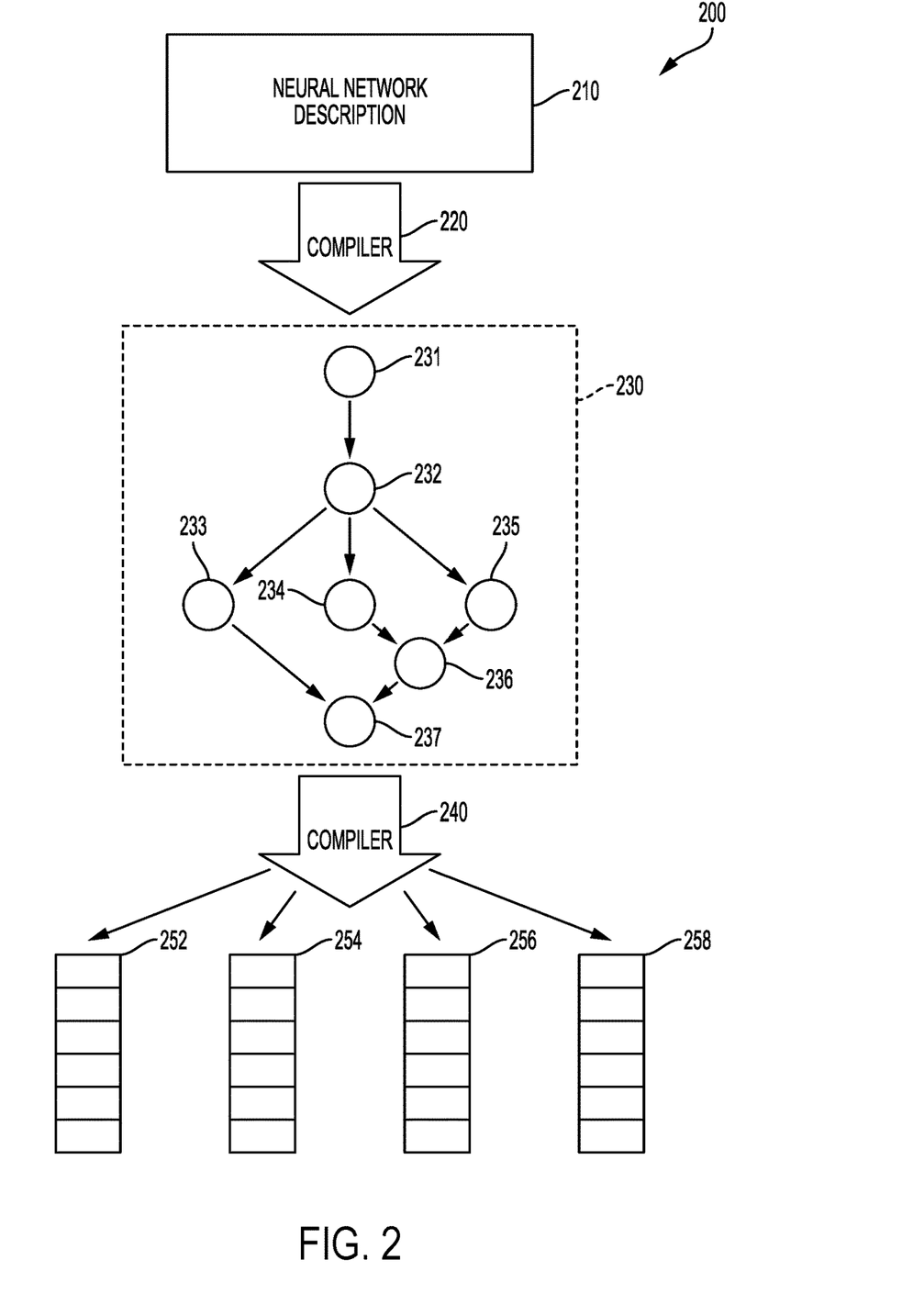
FIG. 2 is a flow diagram of an exemplary operation of a compiler for an inference accelerator in accordance with an embodiment of the disclosure.

FIG. 2 is a hybrid schematic and flow diagram 200 for exemplary operation of a compiler which may be configured to schedule operations on inference accelerator 100 of FIG. 1. A neural network description 210 is provided to the compiler, which, in a first phase, transforms, in step 220, the neural network description 210 into a form that may be represented by directed acyclic graph 230. A directed acyclic graph is a graph that has forward progress, without loop-backs, among its nodes (e.g., a tree structure progressing from the trunk to the leaves). The graph 230 comprises a plurality of tasks represented by graph nodes 231, 232, 233, 234, 235, 236, and 237. Graph 230 shows that task 231 must be performed first, and then task 232, but then any of tasks 233, 234, and 235 may be performed. In addition, graph 230 shows that both tasks 234 and 235 have to be completed before task 236 can be executed (in other words, task 236 is dependent on tasks 234 and 235). Similarly, task 237 is dependent on tasks 233 and 236.

In a second phase, in step 240, the compiler converts the tasks 231-237, shown in graph 230, into command lists 252, 254, 256, and 258 and schedules them for processing on corresponding hardware processing elements such as scalar, vector, matrix, and data movement blocks of the processing elements 102, 104, 106, and 108 of FIG. 1. In other words, command lists 252, 254, 256, and 258 may correspond, respectively, to vector processing module 151, matrix processing module 152, scalar processing module 153, and memory processing module 154 of FIG. 1A. The scheduling may be optimized for factors such as, for example, time, power, or resource requirements.

The compiler may be optimized for use with neural networks, and thus it may generate "static" workloads. Specifically, since branching and iteration counts may be known ahead of time, they may be used to generate static workloads, as opposed to, for example, conventional CPU or GPU code, which may have unpredictable branching behavior and iteration counts and, consequently, would require generating dynamic workloads. Because these workloads are static, the command lists generated by the compiler may permit workload balancing in the computing device 100 by dispatching a portion of a total workload to be executed to the computing device 100 after which the computing device 100 may wait (and may possibly even enter a low-power state) for further instructions. This workload distribution and balancing is referred to herein as "dispatch scaling." Note that, in generating parallel workloads, the compiler may direct the replication of data sets between processing elements, where the replication may be performed using the multicast capabilities of the compute network 142.

The above is possible because, since the workload is static, dispatching one-fourth of a total workload (e.g., one fourth of the total operations), for example, will result in the one-fourth of the total workload being completed. This contrasts with a conventional CPU/GPU workload, in which it may be essentially impossible to predict ahead of time how much of a total workload may be completed by providing one-fourth of the workload to the computing device, and thus, in order to save power, conventional methods such a frequency and voltage scaling may be used. Further, instead of generating command lists, which would conventionally be interpreted by software running on the processing elements 102, 104, 106, and 108, the compiler may alternatively generate static code which is executed in sequence. Dispatch scaling may be used in either case (command lists or statically generated code).

Although the compiler attempts to generate command lists that are fully parallelizable and do not have interdependencies, sometimes this may not be feasible. In cases where interdependencies exist, since the computing device 100 does not implement coherency, the compiler will insert a synchronization indicator (e.g., a semaphore) that is mapped to a hardware semaphore resource. Different processing elements may interact, via, e.g., GSM 136, using the semaphore to guarantee that dependencies are satisfied. The compiler may schedule tasks to command lists based on optimistic estimated completion times and the semaphores may be relied on to guarantee that dependencies are satisfied where actual completion times exceed the estimated completion times.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions or design data that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. In the case of design data, the data may be an electronic representation of a physical design of a circuit, may be readable by integrated circuit fabrication equipment, and may be in a file format such as GDSII, GERBER, or the like. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An inference accelerator comprising:
    a memory system;
    a plurality of processing elements, each processing element:
        having a corresponding tightly coupled memory (TCM);
        coupled to the memory system; and
        adapted to access the memory system; and
    a global synchronization manager (GSM) module coupled to the plurality of processing elements and to the memory system, the GSM adapted to synchronize operations of the plurality of processing elements and memory system using corresponding synchronization modules of each of the plurality of processing elements.

2. The inference accelerator of claim 1, wherein the processing elements do not implement a coherency protocol with respect to the memory system.

3. The inference accelerator of claim 1, wherein each processing element further comprises:
    a vector processor adapted to perform floating point operations;
    a scalar processor; and
    a matrix processor adapted to perform floating point operations.

4. The inference accelerator of claim 1, wherein:
the plurality of processing elements are interconnected by a first network configured to support multicast operations; and
each of the plurality of processing elements is connected to the memory system by a second network separate from the first network.

5. The inference accelerator of claim 4, wherein the inference accelerator further comprising a controller connected to the second network.

6. The inference accelerator of claim 4, wherein:
the GSM is coupled to each of the processing elements via a third network separate from the first network and the second network;
each of the processing elements comprises a local sync manager configured to function as the corresponding synchronization module; and
the GSM is configured to provide configuration information to the local sync manager of each processing element of the plurality of processing elements via the third network.

7. The inference accelerator of claim 1, wherein the first network is configured to implement zero encoding.

8. The inference accelerator of claim 1, wherein:
the synchronization modules of the plurality of processing elements used by the GSM to synchronize operations of the plurality of processing elements are the corresponding TCMs;
each TCM is adapted to store a set of synchronization variables; and
the GSM is adapted to store and adjust the synchronization variables in the TCMs.

9. The inference accelerator of claim 1, wherein the inference accelerator is configured to:
transform a neural network model into a directed acyclic graph;
transform the directed acyclic graph into computation and data movement operations; and
schedule the computation and data movement operations for execution in parallel pipelines by the processing elements, wherein the computation and data movement operations are dispatched using dispatch scaling.

10. The inference accelerator of claim 9, wherein:
the plurality of processing elements is interconnected by a first network configured to perform multicast operations; and
the scheduling of computation and data movement operations includes the replication of data sets using multicast operations on the first network.

11. An apparatus comprising the inference accelerator of claim 1, further comprising a plurality of interconnected additional inference accelerators configured substantially the same as the inference accelerator and connected to the inference accelerator.

12. A method for an inference accelerator having a plurality of processing elements, a memory system coupled to each of the processing elements, and a global synchronization manager (GSM) module coupled to the plurality of processing elements and to the memory system, wherein each processing element comprises a tightly coupled memory (TCM), the method comprising:
accessing, by each processing element, the memory system; and
synchronizing, by the GSM, operations of the plurality of processing elements and memory system using corresponding synchronization modules of each of the plurality of processing elements.

13. The method of claim 12, wherein the processing elements do not implement a coherency protocol with respect to the memory system.

14. The method of claim 12, wherein:
each processing element further comprise a vector processor, a scalar processor, and a matrix processor; and
the method further comprises:
performing floating point operations by the vector processor; and
performing floating point operations by the matrix processor.

15. The method of claim 12, wherein:
the plurality of processing elements are interconnected by a first network;
the method further comprises performing multicast operations by the first network; and
each of the plurality of processing elements is connected to the memory system by a second network separate from the first network.

16. The method of claim 15, wherein:
the GSM is coupled to each of the processing elements via a third network separate from the first network and the second network;
each of the processing elements comprises a local sync manager configured to function as the corresponding synchronization module of the processing element;
the method further comprises providing, by the GSM, configuration information to the local sync manager of each processing element of the plurality of processing elements via the third network.

17. The method of claim 12, further comprising implementing zero encoding by the first network.

18. The method of claim 12, wherein:
the synchronization modules of the plurality of processing elements used by the GSM to synchronize operations of the plurality of processing elements are the corresponding TCMs;
each TCM is adapted to store a set of synchronization variables; and
the method further comprises storing and adjusting a set of synchronization variables of the TCM of one of the plurality of processing elements.

19. The method of claim 12, further comprising:
transforming a neural network into a directed acyclic graph;
transforming the directed acyclic graph into computation and data movement operations; and
scheduling the computation and data movement operations for execution in parallel pipelines by the processing elements, wherein the computation and data movement operations are dispatched using dispatch scaling.

20. The method of claim 19, wherein:
the plurality of processing elements is interconnected by a first network configured to perform multicast operations; and
the scheduling of computation and data movement operations includes replicating data sets using multicast operations on the first network.

21. An apparatus including a means for inference acceleration; the inference-acceleration means comprising:
a means for memory storage and retrieval;
a plurality of means for processing, each means for processing:
having a corresponding means for tightly coupling memory (TCM);
coupled to the means for memory storage and retrieval; and adapted to access the means for memory storage and retrieval; and a means for global synchronization management (GSM) coupled to, and different from, the plurality of means for processing and to the memory means and adapted to synchronize operations of the plurality of means for processing and memory means, using corresponding synchronization modules of each of the plurality of means for processing.

* * * * *